(12) United States Patent
He

(10) Patent No.: US 10,809,462 B2
(45) Date of Patent: Oct. 20, 2020

(54) FIBER OPTIC ADAPTER

(71) Applicant: HYC Co., Ltd., Qingyuan (CN)

(72) Inventor: Yong He, Qingyuan (CN)

(73) Assignee: HYC Co., Ltd, Qingyuan, Guangdong (CN)

( * ) Notice: Subject to any disclaimer, the term of this patent is extended or adjusted under 35 U.S.C. 154(b) by 0 days.

(21) Appl. No.: 16/449,710

(22) Filed: Jun. 24, 2019

(65) Prior Publication Data

US 2020/0012049 A1 Jan. 9, 2020

(30) Foreign Application Priority Data

Jun. 22, 2018 (CN) .......................... 2018 2 0970110

(51) Int. Cl.
*G02B 6/38* (2006.01)
*G02B 6/42* (2006.01)

(52) U.S. Cl.
CPC ......... *G02B 6/3825* (2013.01); *G02B 6/3849* (2013.01); *G02B 2006/4297* (2013.01)

(58) Field of Classification Search
None
See application file for complete search history.

(56) References Cited

U.S. PATENT DOCUMENTS

| 8,821,031 B2 * | 9/2014 | Lin | G02B 6/3825 |
| | | | 385/59 |
| 9,494,746 B2 * | 11/2016 | Sanders | G02B 6/3825 |
| 2010/0054665 A1 * | 3/2010 | Jones | G02B 6/3825 |
| | | | 385/59 |
| 2019/0212502 A1 * | 7/2019 | Hsu | G02B 6/3849 |

FOREIGN PATENT DOCUMENTS

GB 2506890 A * 4/2014 .......... G02B 6/3825

* cited by examiner

*Primary Examiner* — Michelle R Connelly
(74) *Attorney, Agent, or Firm* — Gregory L. Porter; Hunton Andrews Kurth LLP

(57) ABSTRACT

A fiber optic adapter is disclosed by the present disclosure, and belongs to the technical field of fiber optic adapter. The fiber optic adapter includes at least two ports for connecting to a fiber optic connector. Each of the ports is provided with a light shielding plate. An elastic member is shared between every two adjacent light shielding plates, and configured to support the every two adjacent light shielding plates to shield ports corresponding to the every two adjacent light shielding plates. In the present disclosure, the elastic member is shared between the two light shielding plates, so that the assembly efficiency is improved, thereby solving the problem that the assembly of the elastic tabs of the existing fiber optic adapter is relatively cumbersome.

10 Claims, 3 Drawing Sheets

FIBER OPTIC ADAPTER

CROSS-REFERENCES TO RELATED APPLICATIONS

This application claims priority to Chinese patent application No. 201820970110.4 filed on Jun. 22, 2018, disclosure of which is incorporated herein by reference in its entirety.

TECHNICAL FIELD

The present disclosure relates to the technical field of a fiber optic link device, and especially to a fiber optic adapter.

BACKGROUND

A fiber optic adapter is widely used in the field of a fiber optic link device, and fiber optic connectors with different interface types may be inserted into two ends of the fiber optic adapter, to realize the conversion between different interfaces such as FC, SC, ST, LC, MTRJ, MPO and E2000. In order to facilitate the connection of the connectors at the two ends, the fiber optic adapter is connected with the fiber optic connector through a port. A sleeve is arranged between the corresponding ports. The fiber optic connectors located at the two ends of the fiber optic adapter are respectively inserted into the corresponding ports. Optical fibers at heads of the fiber optic connectors are respectively inserted into two ends of the sleeve, and aligned through the sleeve, to avoid the misalignment of the optical fibers and reduce the loss.

The existing fiber optic adapter usually adopts an elastic tab to realize the opening and closing of an individual cover plate (namely the light shielding plate) and an individual channel (namely the ports), therefore, the assembly of the elastic tabs (namely the elastic member) of the fiber optic adapter is relatively cumbersome, thereby leading to a low production efficiency. In addition, the existing fiber optic adapter adopts one elastic tab to realize the mutual opening and closing of two cover plates and two channels, which cannot achieve individual opening and closing, thus the application effect is poor.

Therefore, there is an urgent need to provide a new type of fiber optic adapter to solve the above problems.

SUMMARY

An object of the present disclosure is to provide a fiber optic adapter, to solve the problem that the assembly of the elastic tabs of the existing fiber optic adapter is relatively cumbersome.

In order to achieve this object, the technical scheme adopted by the present disclosure is as follows.

A fiber optic adapter includes at least two ports for connecting to a fiber optic connector. Each of the ports is provided with a light shielding plate. An elastic member is shared between every two adjacent light shielding plates, and configured to support the every two adjacent light shielding plates to shield ports corresponding to the every two adjacent light shielding plates.

In one embodiment, an even number of the ports are provided.

In one embodiment, the elastic member is integrally formed, and arranged on inner sides of the every two adjacent light shielding plates.

In one embodiment, the elastic member includes:

a first supporting arm, abutted against an inner side of one of the every two adjacent light shielding plates;
a second supporting arm, abutted against an inner side of another of the every two adjacent light shielding plates;
a spring, connected to the first supporting arm and the second supporting arm respectively, and arranged at a bottom between the every two adjacent light shielding plates.

In one embodiment, each of the light shielding plates is provided with an avoiding groove for avoiding an optical fiber at an end of the fiber optic connector.

In one embodiment, a limiting block is arranged on the inner side of the each of the light shielding plates, and a space for accommodating the first supporting arm and the second supporting arm is formed at a position between the limiting block and the avoiding groove.

In one embodiment, the fiber optic adapter further includes a main body portion and a lid body clamped to the main body portion. The at least two ports are formed by clamping the lid body to the main body portion.

In one embodiment, each of the light shielding plates is rotatably arranged on the main body portion.

The advantageous effects of the present disclosure are as follows.

In the present disclosure, by sharing the elastic member, which is configured to support the every two adjacent light shielding plates to shield the corresponding ports, between the every two adjacent light shielding plates, each of the light shielding plates of the ports of the adapter can be independently opened or closed. And the elastic member is shared between the two light shielding plates, so that the assembly efficiency is improved, thereby solving the problem that the assembly of the elastic tabs of the existing fiber optic adapter is relatively cumbersome.

1—main body portion; 2—lid body;
11—port; 12—light shielding plate; 13—elastic member; 121—avoiding groove; 122—limiting block; 131—first supporting arm; 132—second supporting arm; 133—spring.

DETAILED DESCRIPTION

Hereinafter the technical solution of the present disclosure will be further described in conjunction with accompanying drawings and embodiments.

Figure 1:
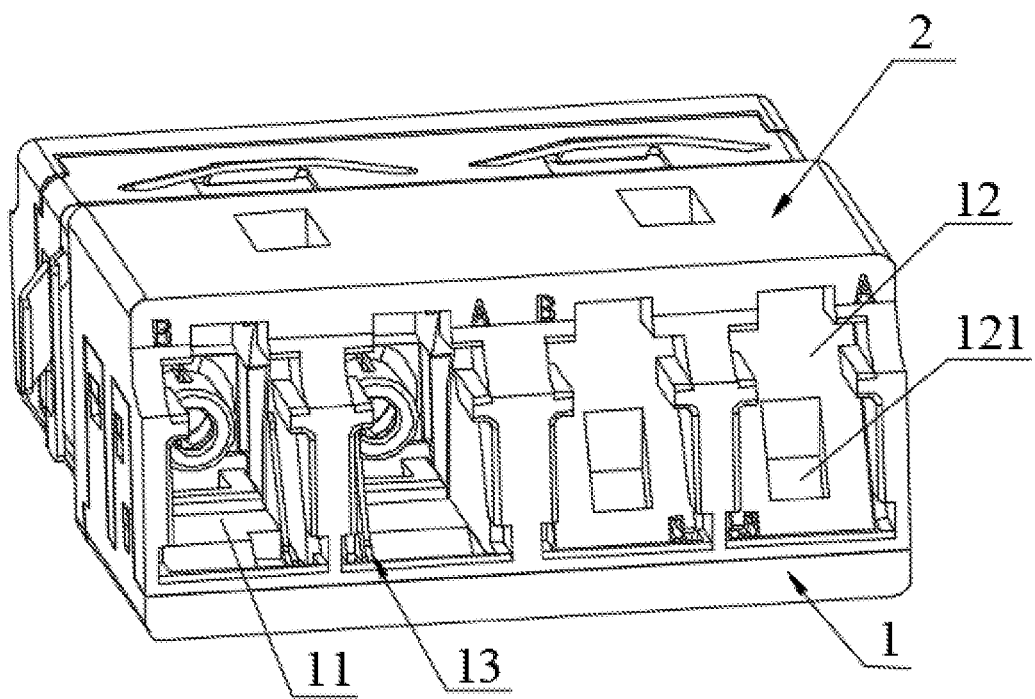
FIG. 1 is a structural schematic diagram of a fiber optic adapter provided by the present disclosure.

FIG. 1 is a structural schematic diagram illustrating a fiber optic adapter provided by the present disclosure. The fiber optic adapter includes at least two ports 11 for connecting to fiber optic connectors (not shown in the drawings). In one example, an even number of ports 11 are provided, for example, the even number may be 2, 4, 6 and the like. Each of the ports 11 is provided with a light shielding plate 12. An elastic member 13 is shared between every two adjacent light shielding plates 12, and configured to support the two adjacent light shielding plates 12 to shield the corresponding ports 11 thereof, namely enable the light shielding plate 12 to independently open or close. In the present disclosure, by sharing the elastic member 13, which is configured to support the every two adjacent light shielding plates 12 to shield the corresponding ports 11, between the every two adjacent light shielding plates 12, each of the light shielding plates 12 of the ports 11 of the adapter can be independently opened or closed. And the elastic member 13 is shared between the two light shielding plates 12, so that the assembly efficiency is improved, thereby solving the problem that the assembly of the elastic tab of the existing fiber optic adapter is relatively cumbersome.

In one embodiment, the fiber optic adapter further includes a main body portion 1 and a lid body 2 clamped to the main body portion 1. A plurality of ports 11 are formed by clamping the lid body 2 to the main body portion 1. In one embodiment, the main body portion 1 is provided with a rotating shaft (not shown in the drawings). Each of the light shielding plates 12 may be rotatably arranged at a respective port 11 of the main body portion 1 through the rotating shaft. It should be understood that, based on the considerations of ease of installation, a plurality of elastic members 13 may be preferably sleeved on the rotating shaft, thereby realizing the assembly of the plurality of light shielding plates 12 and the plurality of elastic members 13.

Figure 2:
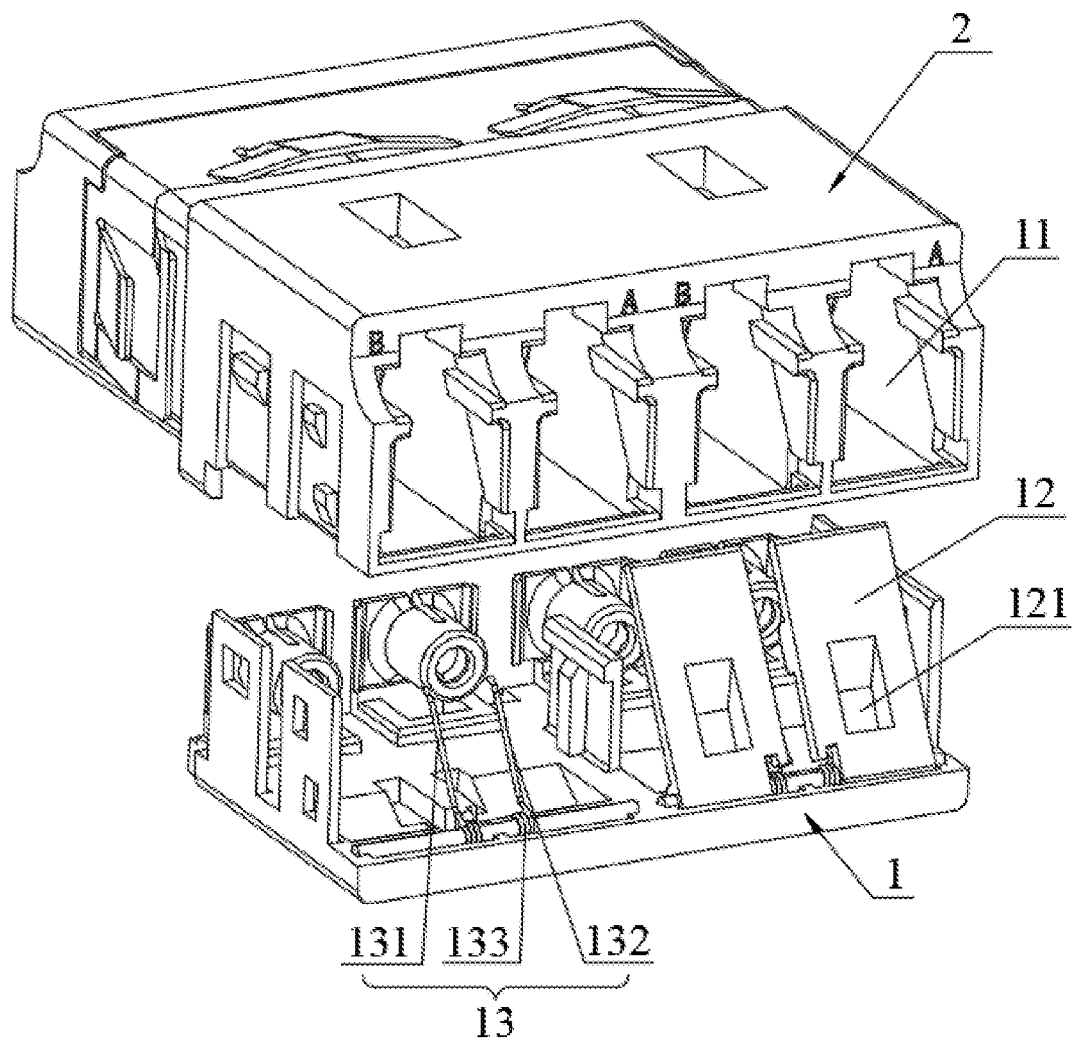
FIG. 2 is an exploded schematic diagram of FIG. 1.
Figure 3:
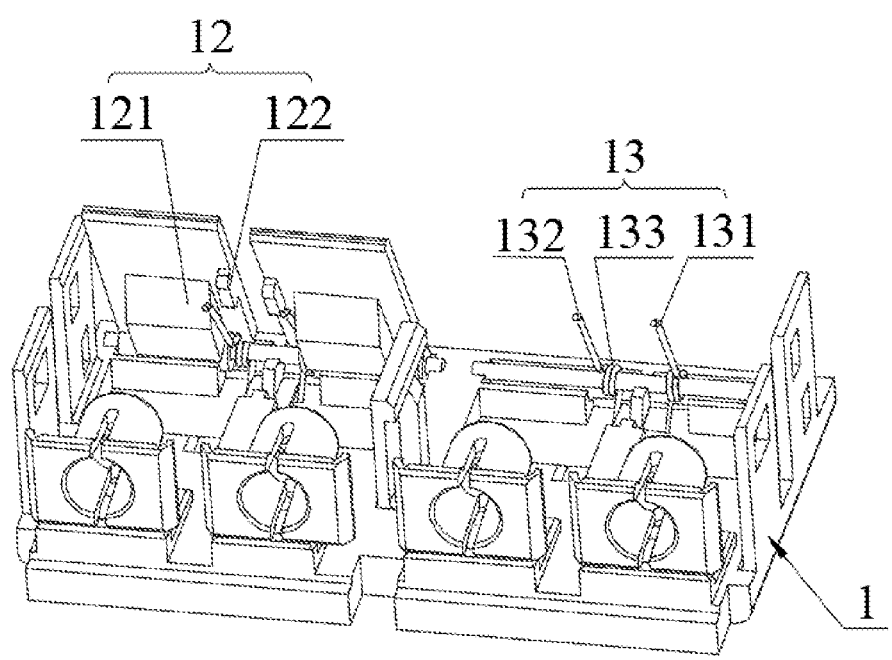
FIG. 3 is a rear view illustrating a main body portion in FIG. 2.

FIG. 2 is an exploded schematic diagram of FIG. 1. In one embodiment, each of elastic members 13 is integrally formed and arranged on an inner side of the every two adjacent light shielding plates 12, thereby realizing the support of the elastic members 13 to the light shielding plates 12. It should be understood that the elastic members 13 only need to realize the supporting effect for the light shielding plates 12. In one example, a supporting portion of an elastic member 13 is embedded in the interior of a respective light shielding plate 12. In another example, the supporting portion is integrally formed with the respective light shielding plate 12 during the machining. In still another example, the light shielding plate 12 may be provided with a groove or the like capable of accommodating the supporting portion.

In one embodiment, each of the elastic members 13 includes a first supporting arm 131, a second supporting arm 132 and a spring 133. The first supporting arm 131 is abutted against the inner side of one of the two adjacent light shielding plates 12, and the second supporting arm 132 is abutted against the inner side of another of the two adjacent light shielding plates 12. The spring 133 is connected to the first supporting arm 131 and the second supporting arm 132 respectively, and arranged at a bottom between the every two adjacent light shielding plates 12. It should be understood that the first supporting arm 131 and the second supporting arm 132 are the aforementioned supporting portions.

In one embodiment, each of the light shielding plates 12 is provided with an avoiding groove 121 for avoiding an optical fiber at the end of the fiber optic connector, which can prevent the optical fiber at the end of the fiber optic connector from being damaged when the fiber optic connector is inserted.

In one embodiment, a manner for conveniently fixing the first supporting arm 131 and the second supporting arm 132 may be as follows. A limiting block 122 is arranged on the inner side of the each of the light shielding plates 12. A space for accommodating the first supporting arm 131 and the second supporting arm 132 is formed at a position of the limiting block 122 opposite to the avoiding groove 121.

Apparently, the above embodiments of the present disclosure are merely examples for clearly illustrating the present disclosure, and are not intended to limit the implementing modes of the present disclosure. Those having ordinary skill in the art may make various obvious modification, readjustment and replacement without departing from the protection scope of the present disclosure. There is no need and no way to exhaust all implementing modes. Any and all modifications, equivalents, and modifications made within the spirits and principles of the present disclosure are within the protection scope of claims of the present disclosure.

What is claimed is:

1. A fiber optic adapter, comprising at least two ports for connecting to a fiber optic connector, wherein each of the ports is provided with a light shielding plate; an elastic member is shared between every two adjacent light shielding plates, and configured to support the every two adjacent light shielding plates to shield ports corresponding to the every two adjacent light shielding plates;
   wherein the elastic member is integrally formed, and arranged on inner sides of the every two adjacent light shielding plates;
   wherein the elastic member comprises:
   a first supporting arm, abutted against an inner side of one of the every two adjacent light shielding plates;
   a second supporting arm, abutted against an inner side of another of the every two adjacent light shielding plates; and
   a spring, connected to the first supporting arm and the second supporting arm respectively, and arranged at a bottom between the every two adjacent light shielding plates.

2. The fiber optic adapter according to claim 1, wherein an even number of the ports are provided.

3. The fiber optic adapter according to claim 2, further comprising a main body portion and a lid body clamped to the main body portion; wherein the at least two ports are formed by clamping the lid body to the main body portion.

4. The fiber optic adapter according to claim 1, wherein each of the light shielding plates is provided with an avoiding groove for avoiding an optical fiber at an end of the fiber optic connector.

5. The fiber optic adapter according to claim 4, wherein a limiting block is arranged on the inner side of the each of the light shielding plates, and a space for accommodating the first supporting arm and the second supporting arm is formed at a position between the limiting block and the avoiding groove.

6. The fiber optic adapter according to claim 5, further comprising a main body portion and a lid body clamped to the main body portion; wherein the at least two ports are formed by clamping the lid body to the main body portion.

7. The fiber optic adapter according to claim 4, further comprising a main body portion and a lid body clamped to the main body portion; wherein the at least two ports are formed by clamping the lid body to the main body portion.

8. The fiber optic adapter according to claim 1, further comprising a main body portion and a lid body clamped to the main body portion; wherein the at least two ports are formed by clamping the lid body to the main body portion.

9. The fiber optic adapter according to claim 8, wherein each of the light shielding plates is rotatably arranged on the main body portion.

10. The fiber optic adapter according to claim 1, further comprising a main body portion and a lid body clamped to the main body portion; wherein the at least two ports are formed by clamping the lid body to the main body portion.

* * * * *